United States Patent
Gelonese

(10) Patent No.: US 7,622,822 B2
(45) Date of Patent: Nov. 24, 2009

(54) POWER SAVER CONTROLLER

(75) Inventor: Giuseppe Antonio Gelonese, Para Hills (AU)

(73) Assignee: Electronic Data Control Pty. Ltd., Prospect (AU)

( * ) Notice: Subject to any disclaimer, the term of this patent is extended or adjusted under 35 U.S.C. 154(b) by 0 days.

(21) Appl. No.: 11/569,329

(22) PCT Filed: May 18, 2005

(86) PCT No.: PCT/AU2005/000707

§ 371 (c)(1),
(2), (4) Date: Aug. 13, 2007

(87) PCT Pub. No.: WO2005/111766

PCT Pub. Date: Nov. 24, 2005

(65) Prior Publication Data

US 2008/0106148 A1 May 8, 2008

(30) Foreign Application Priority Data

May 19, 2004 (AU) .............................. 2004902643

(51) Int. Cl.
*H02J 3/14* (2006.01)
(52) U.S. Cl. ...................................................... 307/38
(58) Field of Classification Search .................... 307/38
See application file for complete search history.

(56) References Cited

U.S. PATENT DOCUMENTS

| 6,744,150 | B2 * | 6/2004 | Rendic | 307/38 |
| 6,917,506 | B2 * | 7/2005 | Chou | 361/191 |
| 7,193,335 | B2 * | 3/2007 | Palmer et al. | 307/39 |
| 2004/0060985 | A1 * | 4/2004 | Feng | 235/454 |
| 2004/0215990 | A1 | 10/2004 | Allen et al. | |

FOREIGN PATENT DOCUMENTS

| EP | 0766167 | 4/1997 |
| WO | WO-02/14995 | 2/2002 |
| WO | WO-03/062973 | 7/2003 |

OTHER PUBLICATIONS

International Search Report issued in International Application No. PCT/AU2005/000707 mailed Jun. 20, 2005, 3 pages.

* cited by examiner

*Primary Examiner*—Robert L. Deberadinis
(74) *Attorney, Agent, or Firm*—Osha • Liang LLP

(57) ABSTRACT

A power supply control device for supplying power to a number of electrical devices from a single mains supply electrical outlet switch means adapted to connect an electrical supply from the supply electrical outlet to each of the controlled electrical outlets in response to the state of a master electrical device, a state sensor adapted to detect a functional state of the master electrical device, said sensor being adapted to distinguish at least three functional states of the master device. The master device may be personal computer with peripheral devices connected to the controlled outlets.

13 Claims, 4 Drawing Sheets

POWER SAVER CONTROLLER

TECHNICAL FIELD

This invention relates to the control of the supply of electrical power to plug-in electrical equipment, in particular to the control of the supply of electrical power to groups of such electrical equipment where the power supply requirement of these groups is related to the operational status of a main piece of electrical equipment. More particularly it relates to the provision of electrical power to peripheral devices in a personal computer installation.

BACKGROUND ART

A desktop computer installation typically has associated with it a number of peripheral devices and other associated electrical devices, each of which is separately electrically powered. The peripheral devices can include such things as printers, scanners and modems or there may be associated devices such as a desk lamp or a room heater.

These peripheral devices and associated electrical equipment are in general not used when the computer is not in use. However, because they are separately electrically powered the user must, when turning off the computer, also turn off each of the peripheral and associated devices. This is a time consuming process and indeed given the placement of the power switches on many such electrical devices, may be extremely inconvenient.

It is also the case that widely used computer operating systems require significant time to perform certain "housekeeping" tasks in between receiving command to shut down and actually shutting off the power or being in a position to have the power supply to the computer shut off without causing problems for the computer system. During this time, the computer system also may not tolerate having power removed from peripheral devices.

Accordingly many users simply leave the additional devices powered on after the computer has been shut down.

This is not ideal for a number of reasons. The first of these is that the devices continue to consume power which is both costly and a waste of resources. This is particularly a problem since many modern devices use small plug-in transformers to provide the lower operating voltages which they require. These plug-in transformers continue to consume power whilst they are connected to a mains supply even if the power switch on the device which they are supplying with power has been switched off.

It is also the case that all electrical devices have a finite life span of operation and this life span can be made to extend over a longer period of time if the device is switched off when not in use.

It is also advantageous that mains power be removed from devices when not required in order to reduce the possibility of exposure to damaging surges in the mains power supply.

Prior art devices have attempted to deal with this problem by providing relays which cut off power to peripheral devices when no current is flowing to the main device, the main device being the desktop computer itself.

However, most modern desktop computers have the ability to control their power usage to some extent by entering one or more lower power consumption states, usually referred to as standby states. Users may allow the device to spend extended periods in such a standby state, negating most of the advantages of the prior art devices.

DISCLOSURE OF THE INVENTION

Accordingly there is proposed in one form of the invention, a power supply control device for permitting energisation of a plurality of electrical devices from a single mains supply electrical outlet characterized in that there are provided a plurality of controlled electrical outlets and a single electrical input adapted to connect to a mains supply electrical output; switch means adapted to connect electrical supply from the supply electrical outlet to each of the controlled electrical outlets in response to the state of a master electrical device, a state sensor adapted to detect a functional state of a master electrical device, said sensor being adapted to distinguish at least three functional states of the master device.

In preference the three functional states of the master device are off, a reduced power state hereafter called "standby", and a fully on state.

The state sensor may use one or more of a number of possible means to detect the state of the master device. These may include the direct receipt of digital information from the master device indicating its actual or intended functional state.

It may also include connection to any one or more of the output ports of the master device which may include serial or parallel communication ports, USB ports, or any other port.

In preference the state sensor is adapted to sense the power consumption of or current flow to, the master device.

The modern desktop computer generally has a complex and relatively time consuming "power up sequence" which is the series of activities which the computer performs immediately upon being first switched on. This sequence may include activities to discover what peripheral devices are connected to the computer and to establish communication with such peripherals. One of the advantages of the standby mode is that it is not necessary for the computer to go through this power up sequence when it emerges from standby into fully powered mode.

However, this has the problem that some types of peripheral device cannot be switched off while the computer is in standby mode or the computer will lose the ability to communicate with such devices until a full power on sequence is performed.

Accordingly the controlled electrical outlets are controlled such that at least one controlled electrical outlet continues to provide an electrical power supply while the state sensor indicates that the master electrical device is in a standby condition.

In preference, at least one controlled electrical outlet is controlled such that it does not provide an electrical supply when the state sensor indicates that the master electrical device is in a standby state, but only when the state sensor indicates that the master electrical device is in a fully on state.

For example, a modem or an external disk drive would be connected in such a manner that power was not withdrawn from them when the computer is in a standby mode but a printer or a desk lamp might be connected such that they receive power only when the computer is in a fully on mode.

Depending on the individual computer and its particular hardware configuration, the current or power drawn by the computer when in its standby mode may vary.

In preference then, the state sensor is adapted to permit the threshold power or current level at which it will indicate that the master electrical device is in a standby mode to be field resettable.

BRIEF DESCRIPTION OF THE DRAWINGS

The invention will now be described with reference to drawings wherein.

BEST MODE FOR CARRYING OUT THE INVENTION

Figure 1:
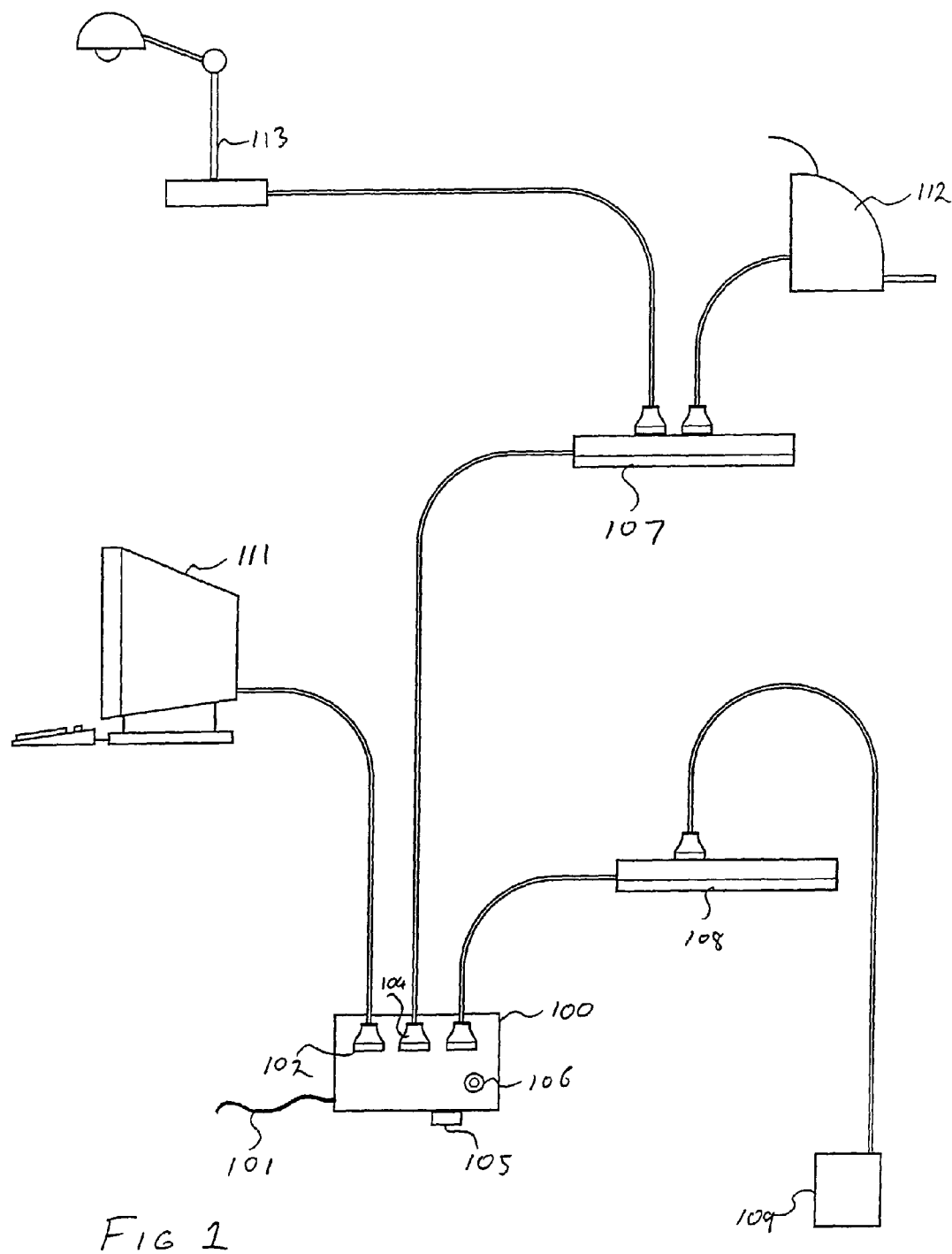
FIG. 1 is a pictorial representation of an embodiment of the invention.

Turning now to FIG. 1 there is shown a perspective drawing of a power supply control device according to an embodiment of the invention. There is a box 100 containing the working circuitry of the device. There is a power cord 101 which is connected to a general-purpose electrical outlet. There is a power outlet 102 which is in permanent electrical connection with the mains power supply to the device. There is a power outlet 104 which is available to have connected to it such electrical loads as require power only when the main computer is in a full power mode. A power board or power strip 107 is connected to this outlet in order to allow multiple devices to be powered in this manner. Exemplary devices of this class, being a printer 112 and a desk lamp 113 are shown.

There is a further electrical outlet 103 which is available for the connection of loads which require power when the computer is in a fully on or a standby mode but which do not require power when the main computer is switched off. A further power board or power strip 108 is connected to this outlet in order to allow multiple devices to be powered in this manner. An exemplary device of this type is a modem 109.

Further there is a connection port 105 for the connection of a serial communications cable to the device. A switch 106, called the "learn" switch, is provided for communicating to the device the fact that the standby threshold should be reset.

Figure 2:
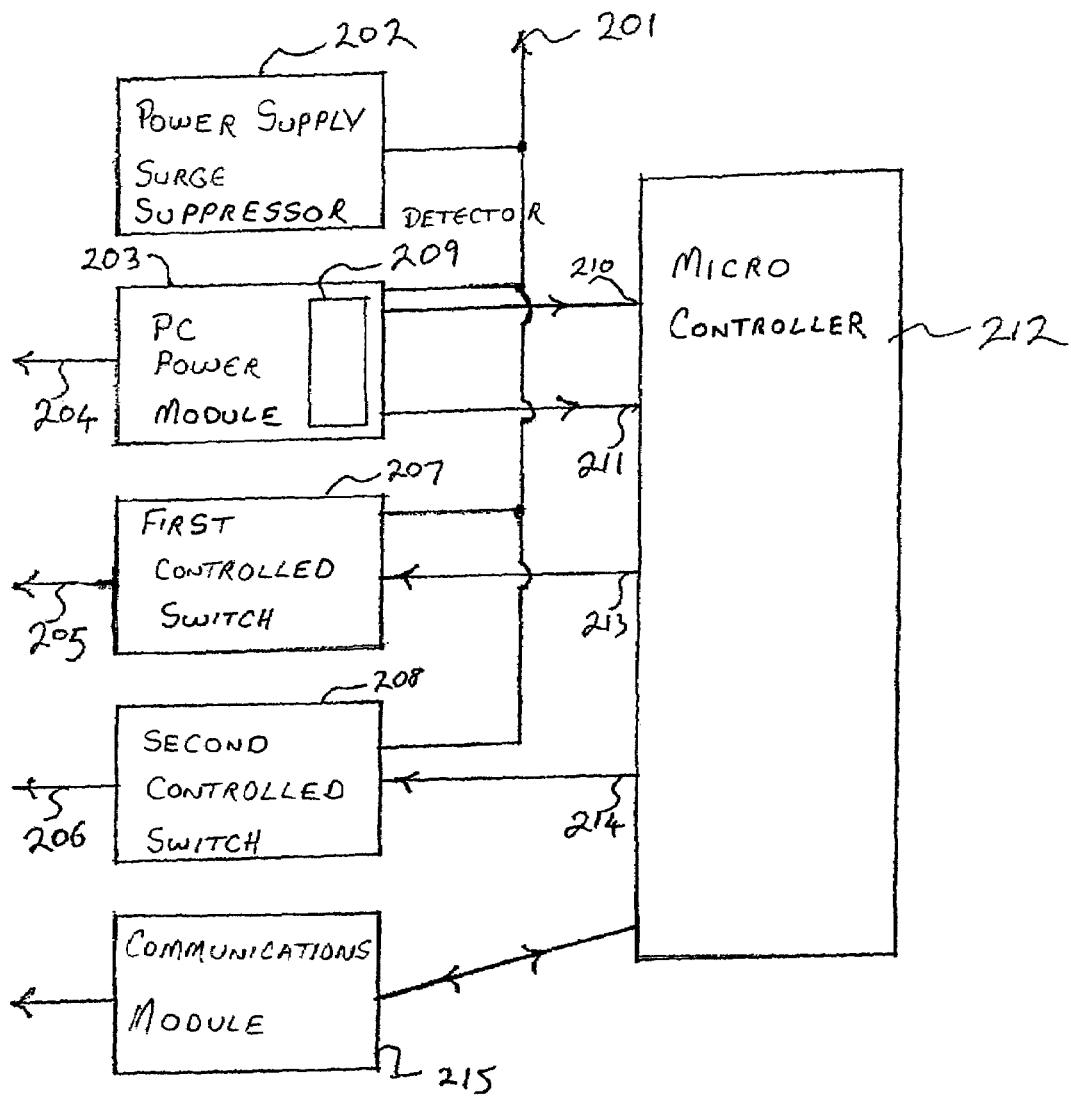
FIG. 2 is a block diagram showing the main functional blocks of an embodiment of the invention.

Considering FIG. 2, the main functional blocks of the device can be seen in block diagram form. There is a mains power inlet 201 which supplies power to a low voltage power supply 202. This supply provides power for the device's electronic components. Mains power is also supplied to the PC power module 203 which provides a non switched output 204 for powering the main electrical device which would usually be a desktop computer. A surge suppressor 202 protects the circuitry from mains power surges.

Mains power is also provided to controlled outputs 205 and 206 via switch means 207 and 208. The power supply to the non switched outlet 204 is monitored via state sensor 209. The state sensor provides signals proportional to the current and voltage drawn by the desktop computer to input 210 and 211 of microcontroller 212.

The microcontroller 212 processes the signals and produces output signal 213 to turn on first controlled switch 207 only when the power drawn by the desktop computer is such that it exceeds a threshold value set to indicate that the computer is fully on and not merely in a standby state.

A signal is produced at output 214 to turn on second controlled switch 208 when the power drawn by the desktop computer is above a threshold indicating that the desktop computer is on but in a standby mode.

Thus first controlled switch 207 is on only when the computer is fully on, while second controlled switch 208 is on when the computer is in either a fully on state or a standby state.

There is also provided a communications module 215 which allows direct data communication between the desktop computer and the power controller device. This may be used to update the microcontroller firmware to set or alter any variables held within the microcontroller, or to allow the computer to directly take on the function of the voltage and current detectors 209 and 210 and directly control switches 207 and 208

Figure 3:
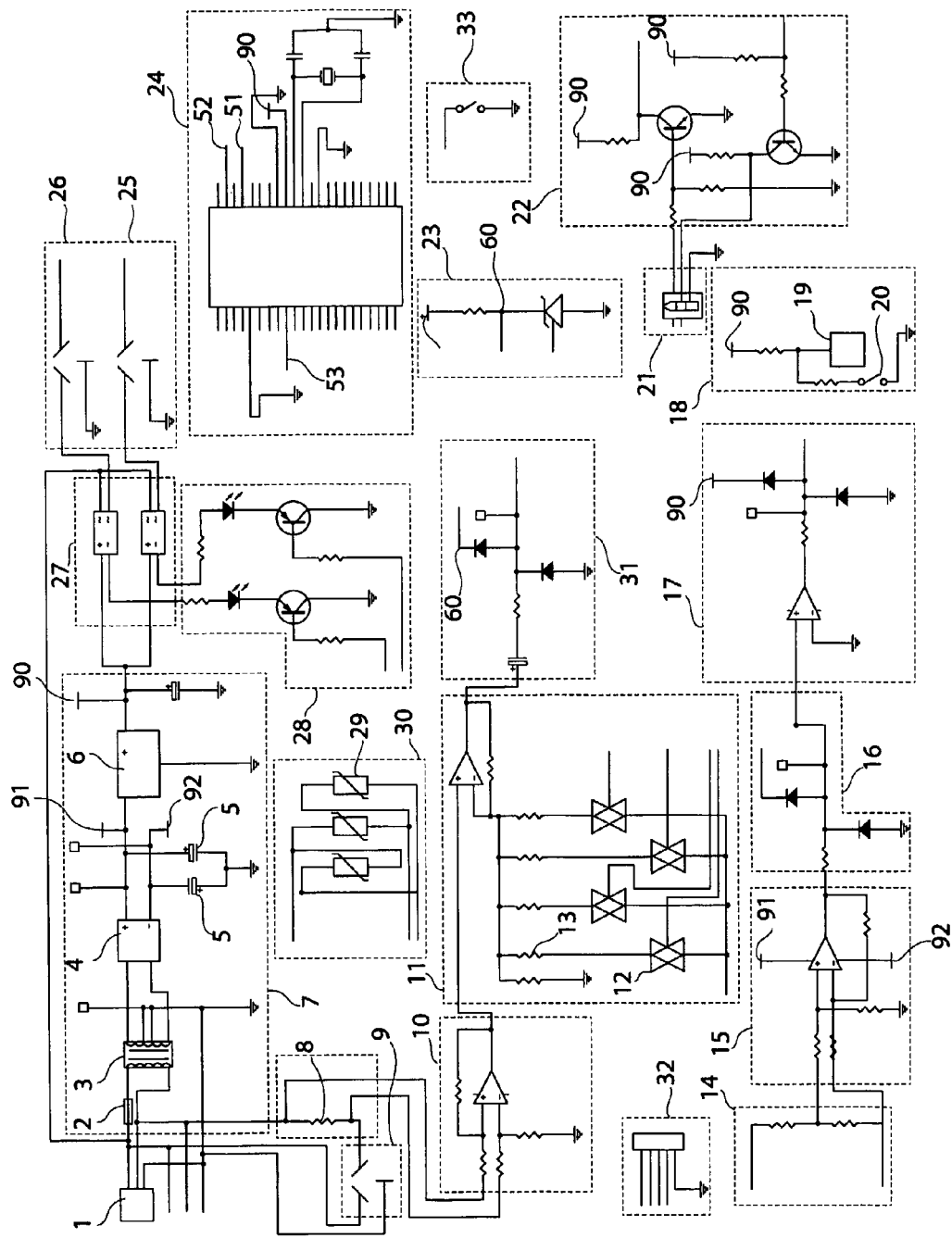
FIG. 3 is a circuit diagram of an embodiment of the invention.

FIG. 3 shows a circuit diagram of an embodiment of the invention. There is a mains power supply plug which provides power to the power supply device and also is the source of the power supply which is switched by the device to the peripheral and associated devices of the computer installation.

There is a low voltage power supply which is shown as block 7. This is made up of a fuse 2, a transformer 3 which has a mains voltage primary coil and two nine-volt secondary coils. DC rectification is provided by a bridge rectifier 4 and a linear voltage regulator 6. This provides a stable five-volt DC power supply.

The surge suppression circuitry 30 is connected in parallel with the power supply. It provides surge suppression using three metal oxide varistors 29 wired in a delta configuration to limit the maximum voltage between any two wires to the breakdown rating of the varistors.

The supply of power to the desktop computer which is supplied via the device of the invention, but is not switched by the device, is provided by power outlet 9. The neutral connection to this plug includes current sensing resistor 8. There is a current signal conditioning differential input amplifier 10. This transfers the reference for the current signal from neutral to earth. If this is not done the neutral connector would need to be connected to the common terminal of the power supply. Through any serial port connection, this would be connected to the neutral or earth conductor of the computer's internal power supply, which could cause unwanted tripping of residual current devices protecting the circuit.

The value of resistor 8 is chosen to be very low in order to reduce the power dissipated in the resistor. Accordingly there is a requirement for a current signal amplifier 11 in order to provide a referenced signal of sufficient magnitude. The gain of this amplifier may be varied under the control of microcontroller 24 by controlling analogue switches 12 in order to place one or more of resistors 13 in or out of circuit.

The current signal is further conditioned by the signal conditioning circuitry 31. A capacitor eliminates any DC offset in the amplifier output while a resistor and two diodes provide a current limit and voltage clamping so that the amplified current signal is in a fixed range about a reference voltage VAref, being the voltage at 60. The signal range is −0.3V to VAref +0.3V. The current detection signal is then applied to analogue to digital converter input 51 of the micro controller 24.

The incoming active and neutral are connected to the resistive divider 14 for the purposes of detection of the voltage applied to the desktop computer. Differential amplifier 15 shifts the reference for the voltage signal from neutral to earth in the same manner as is done by differential input amplifier 10 for the current signal.

The voltage signal is then applied to a conditioning circuit 16 which includes a current limiting resistor and clamping diodes which limit the signal to −0.3v to var ref +0.3v. The signal is applied to input 52 of the micro controller 24 which is configured to be the second channel of an analogue to digital converter.

A zero crossing detector 17 provides a signal to the micro controller 24 when the voltage is at zero. This allows the micro controller to ensure that measurements of the voltage and current signals are synchronised. A voltage reference is provided by an active precision voltage reference 23. This reference voltage is applied to the microcontroller to fix the upper limit of the analogue to digital converter.

Serial communications circuitry 22 allows for the connection of an RS 232 serial port. Solid-state relays 27 control the supply of power to switched power outlets 25, 26. The signals to switch the solid-state relay 27 are provided from the micro controller 24 via transistor buffers 28. The switch 33 is provided to connect the interrupt input 53 of the micro controller 24 to ground when the switch is activated. Software in the micro controller monitors the current/power consumed by the desktop computer and it controls the power outlets 25 and 26.

The microcontroller attempts to automatically detect and establish power levels which correspond to the standby mode and fully off mode of the desktop computer.

Based on historical performance the software within the microprocessor determines which power levels correspond to the standby mode and the shut down model of the desktop computer and stores these values into e-prom. When the threshold value for standby is exceeded output 26 is energised, when the power threshold for the on mode is exceeded then both outputs 25 and 26 are energised.

These automatically determined values can be overwritten. This is achieved by pressing the "learn" switch 106 to place the device into a learning mode, and then placing the desktop computer into a standby state. The switch 106 is then pressed again. The value of the power being consumed by the desktop computer at this time is measured and this value is stored as the standby threshold. The PC is then switched off and the switch 106 pressed again. The micro controller stores this new level of current/power as the threshold indicating that the main computer is off.

The desktop computer power consumption is calculated by taking the voltage signal and the current signal which are applied to input 51 and 52 of the micro controller and multiplying the corresponding samples and applying the relevant calculation to calculate power. This power measurement gives a much more accurate indication of the power consumption of the desktop computer than a simple current measurement as it also takes into account any phase shift between the current and the voltage as well as waveshape.

Figure 4:
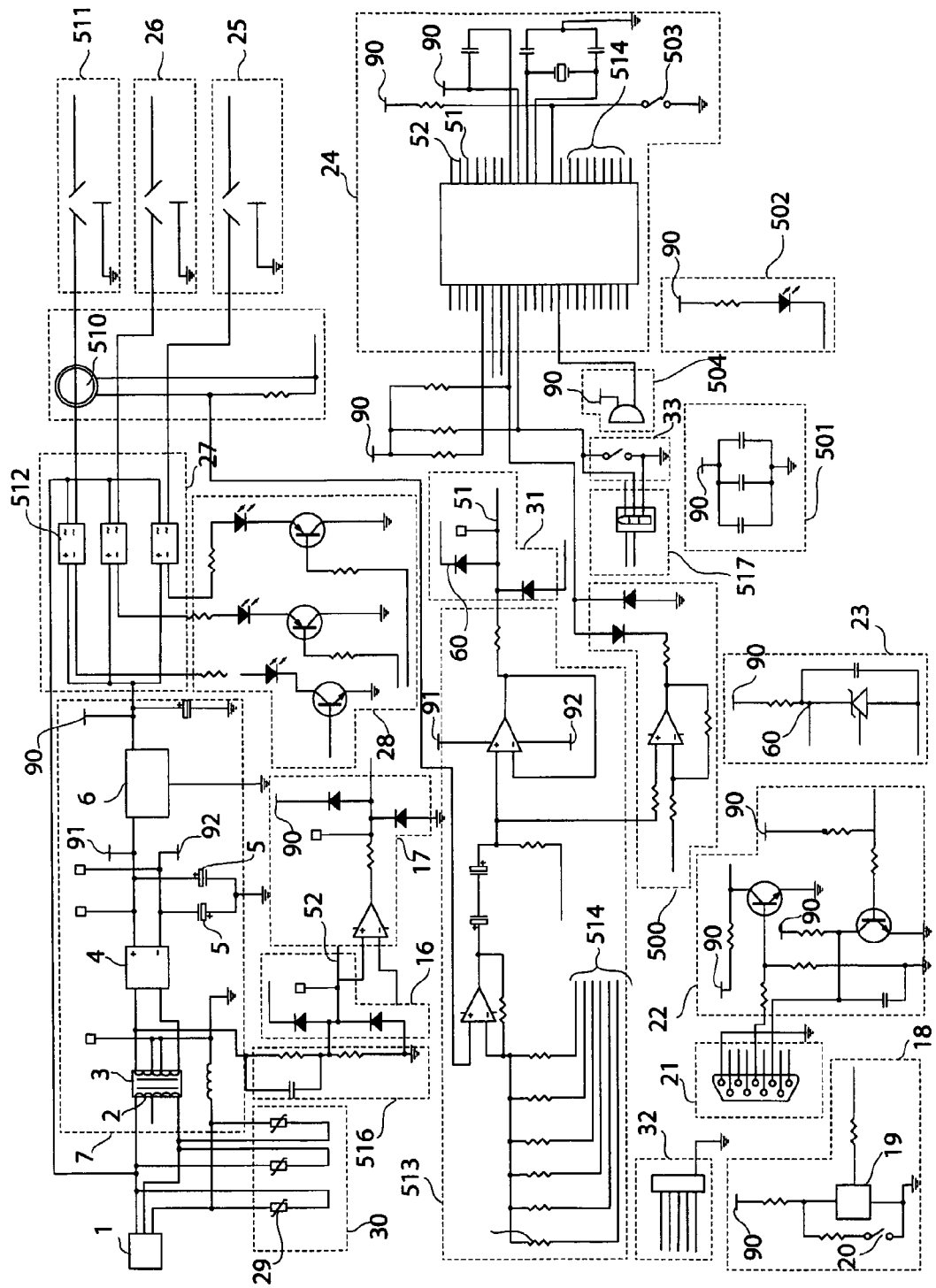
FIG. 4 shows a circuit diagram of a further embodiment of the invention.

FIG. 4 shows a further embodiment of the invention. This circuit operates in the same manner as that of FIG. 3, with the variations described below.

In some circumstances a user may require that power be withdrawn from the computer as well as the peripheral devices when the computer is turned off. This may be because, with modern computer power supplies which are software switched, the computer will continue to draw a small amount of power even when it has been instructed to switch off. Alternatively, some users are simply more comfortable with the knowledge that the computer is isolated from the mains power supply.

In this embodiment, the unswitched power outlet 9 is replaced by a power outlet 511 where the power supply to this outlet is controlled by the microprocessor 24 via solid state relay 512. This operates to remove power from outlet 511 as well as from outlets 25 and 26 when the microprocessor detects that the computer has shutdown.

When this occurs, the computer ON/OFF switch is ineffective, since there is no power to the outlet 511 to which the computer is connected. In order to turn on the PC, the interrupt switch 33 is pressed which causes power to be supplied to power outlet 511 for a brief period (ten seconds in this case). If the PC is switched on during this time, current begins to be drawn through outlet 511 and the power control device is able to operate, supplying power to outlets 511, 25 and 26 as appropriate.

A user may not wish this total shut down of power to occur. Accordingly, there is firmware provided to allow for two modes of operation. In one mode the switch 512 operates as described above. In the second mode, switch 512 is always on an the device behaves in the same manner as the circuit of FIG. 3. The firmware for the microprocessor 24 allows the interrupt switch 33 to be used to communicate which mode is to be employed. An interrupt extension socket 517 is provided to allow the interrupt switch to be placed remotely from the main power control device.

As illustrated in the circuit of FIG. 4, the current sensing resistor 8 may be replaced by a current transformer 510 This has the advantage that the current sense signal is electrically isolated from the mains voltage. This eliminates the need for the current signal conditioning amplifier.

Differential amplifier 15 is also eliminated by providing a mains voltage sensor 516 which is connected to the power supply transformer 3. This mains voltage sensor provides a mains voltage signal to the conditioning circuit 16 which is as described for the embodiment of FIG. 3.

An output of the microprocessor 24 is used to drive Light emitting diode 502 to indicate the operational status of the device. A buzzer 504 is also provided under the control of the microprocessor 24 to allow status messages to be communicated to an operator.

A switch 503 is provided to signal to the microprocessor that it should enter a programming mode to allow reception of firmware upgrades.

The signal from the current transformer 510 is applied to current signal amplifier 513. The gain of this amplifier is controlled by the microprocessor 24 by using control lines 514 to connect selected resistors 515 into the earth path of the amplifier.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

The invention claimed is:

1. A power supply control device for permitting energisation of a plurality of electrical devices from a single mains supply electrical outlet characterized in that there are provided a plurality of controlled electrical outlets;
    a single electrical input adapted to connect to a mains supply electrical output;
    switch means adapted to connect an electrical supply from the supply electrical outlet to each of the controlled electrical outlets in response to the state of a master electrical device,
    a state sensor adapted to sense the value of the power consumption of or current flow to the master device and to use threshold levels of this value to distinguish at least three functional states of the master device.

2. The power supply control device of claim 1 wherein the at least three functional states of the master device include off, standby, and fully on.

3. The power supply control device of claim 1 wherein the state sensor is adapted to receive digital information from the master device indicating its actual or intended functional state.

4. The power supply control device of claim 1 wherein the state sensor is adapted to monitor the state of any port of the master device in order to determine the state of the master device.

5. The power supply control device of claim 4 wherein the port is a serial port.

6. The power supply control device of claim 4 wherein the port is a parallel port.

7. The power supply control device of claim 4 wherein the port is a USB port.

8. The power supply control device of claim 1 wherein at least one controlled electrical outlet continues to provide an electrical power supply while the state sensor indicates that the master electrical device is in an off condition.

9. The power supply control device of claim 1 wherein at least one controlled electrical outlet continues to provide an electrical power supply while the state sensor indicates that the master electrical device is in a standby condition.

10. The power supply control device of claim 1 wherein at least one controlled electrical outlet is controlled such that it does not provide an electrical supply when the state sensor indicates that the master electrical device is in a standby state, but does provide an electrical supply when the state indicator indicates that the master device is in an on state.

11. The power supply control device of claim 1 wherein the state sensor is adapted to permit the threshold power or current level at which it will indicate that the master electrical device is in a standby mode to be set by a user.

12. The power supply control device of claim 1 wherein the state sensor is adapted to permit the threshold power or current level at which it will indicate that the master electrical device is in an on mode to be field set by a user.

13. The power supply control device of claim 1 wherein the state sensor is adapted to permit the threshold power or current level at which it will indicate that the master electrical device is in an off mode to be field set by a user.

* * * * *